(12) United States Patent
Amedure et al.

(10) Patent No.: US 7,025,393 B2
(45) Date of Patent: Apr. 11, 2006

(54) PIPE COUPLER WITH TONGUE AND GROOVE SEALING SLEEVE

(75) Inventors: Michael E. Amedure, Lake Orion, MI (US); Brian T. Ignaczak, Rochester, MI (US)

(73) Assignee: Breeze-Torca Products, LLC, Auburn Hills, MI (US)

( * ) Notice: Subject to any disclaimer, the term of this patent is extended or adjusted under 35 U.S.C. 154(b) by 0 days.

(21) Appl. No.: 10/871,118

(22) Filed: Jun. 19, 2004

(65) Prior Publication Data

US 2004/0222633 A1    Nov. 11, 2004

Related U.S. Application Data

(63) Continuation of application No. 09/886,793, filed on Jun. 21, 2001, now Pat. No. 6,758,501.

(60) Provisional application No. 60/213,791, filed on Jun. 23, 2000.

(51) Int. Cl.
F16L 21/00     (2006.01)
F16L 25/00     (2006.01)

(52) U.S. Cl. .................. 285/419; 285/420; 285/913; 285/330; 285/373

(58) Field of Classification Search ............ 285/369, 285/373, 419, 420, 340, 913, 330; 403/364, 403/381
See application file for complete search history.

(56) References Cited

U.S. PATENT DOCUMENTS

| | | | | |
|---|---|---|---|---|
| 895,143 A | * | 8/1908 | Augensen | 138/99 |
| 1,864,339 A | * | 6/1932 | Church | 285/383 |
| 1,938,974 A | * | 12/1933 | Oldberg | 285/324 |
| 1,978,195 A | * | 10/1934 | Haas | 24/279 |
| 2,227,551 A | * | 1/1941 | Morris | 285/373 |
| 2,495,622 A | * | 1/1950 | Arbogast | 285/289.1 |
| 2,739,018 A | * | 3/1956 | Collett | 175/325.5 |
| 2,776,153 A | * | 1/1957 | Smith | 277/616 |
| 2,956,820 A | * | 10/1960 | De Cenzo | 285/105 |
| 3,004,781 A | * | 10/1961 | Morris | 285/369 |
| 3,053,554 A | * | 9/1962 | Magos et al. | 285/114 |
| 3,435,823 A | * | 4/1969 | Edwards | 606/153 |
| 3,565,468 A | * | 2/1971 | Garrett | 285/373 |
| 3,905,623 A | * | 9/1975 | Cassel | 285/382 |
| 4,049,298 A | * | 9/1977 | Foti | 285/148.26 |
| 4,056,273 A | * | 11/1977 | Cassel | 285/337 |
| 4,142,743 A | * | 3/1979 | McGowen et al. | 285/148.26 |
| 4,473,246 A | * | 9/1984 | McDowell, deceased | 285/373 |
| 4,583,770 A | * | 4/1986 | Kreku et al. | 285/148.26 |

(Continued)

FOREIGN PATENT DOCUMENTS

DE    42 16 921 A1    9/1993

(Continued)

*Primary Examiner*—James M. Hewitt
(74) *Attorney, Agent, or Firm*—Reising, Ethington, Barnes, Kisselle, P.C.

(57) ABSTRACT

A coupler for use in joining two pipes in a butt joint. The coupler includes a band clamp and a split sealing sleeve disposed inside to band clamp for encircling the abutted ends of the pipes. The split sealing sleeve has a tongue-and-groove sealing joint at the confronting free ends of the sleeve. The sealing joint has a member at the mating edges to provide a resilient interference fit of the tongue-and-groove.

14 Claims, 4 Drawing Sheets

U.S. PATENT DOCUMENTS

| | | | | |
|---|---|---|---|---|
| 4,629,226 A | * | 12/1986 | Cassel et al. | 285/382 |
| 4,660,862 A | * | 4/1987 | Cassel et al. | 285/114 |
| 4,813,718 A | * | 3/1989 | Matter et al. | 285/373 |
| 5,267,425 A | * | 12/1993 | Onysko et al. | 52/729.2 |
| 5,323,584 A | * | 6/1994 | Scarlett | 52/729.4 |
| 5,588,680 A | * | 12/1996 | Cassel et al. | 285/3 |
| 5,823,581 A | * | 10/1998 | Coppolo | 285/373 |
| 6,089,624 A | * | 7/2000 | Cassel et al. | 285/382 |
| 6,199,921 B1 | * | 3/2001 | Cassel et al. | 285/424 |
| 6,398,267 B1 | * | 6/2002 | Detable et al. | 285/273 |

FOREIGN PATENT DOCUMENTS

DE 4216921 A1 * 9/1993

* cited by examiner

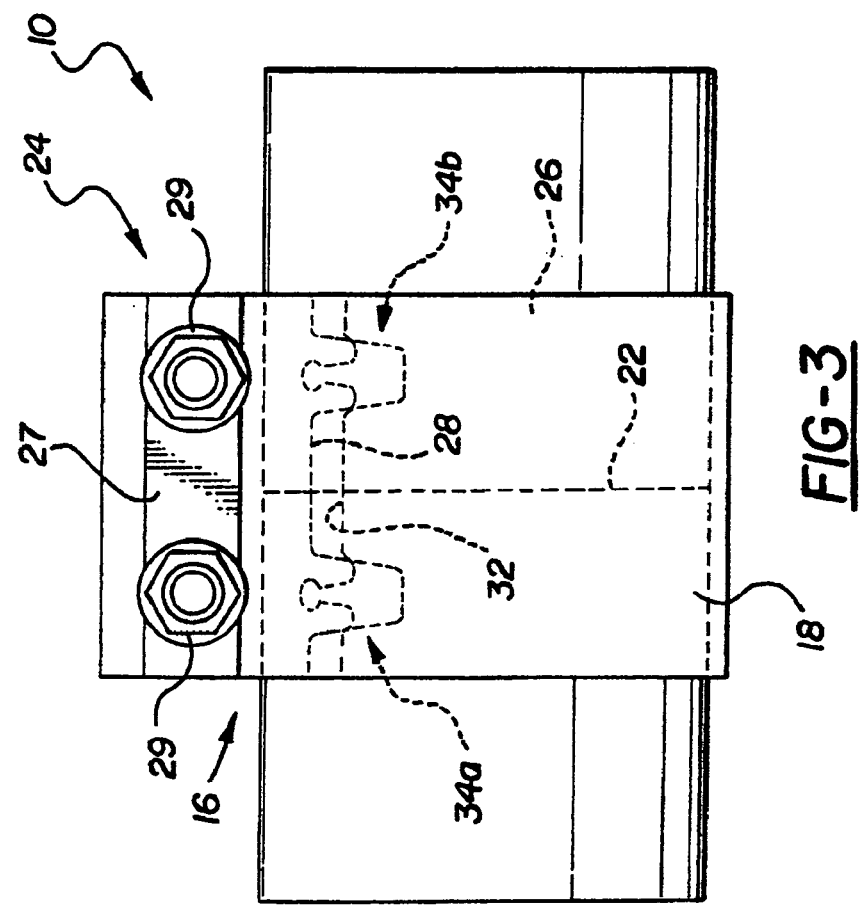
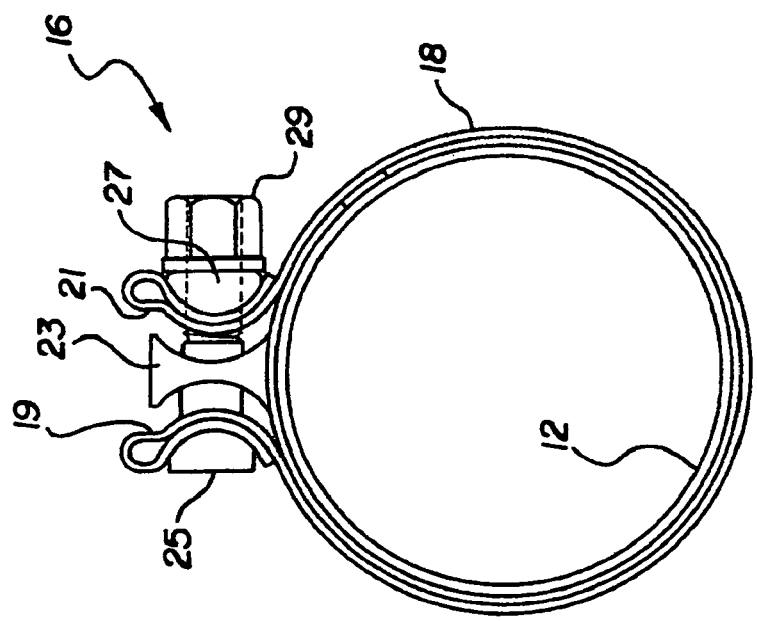

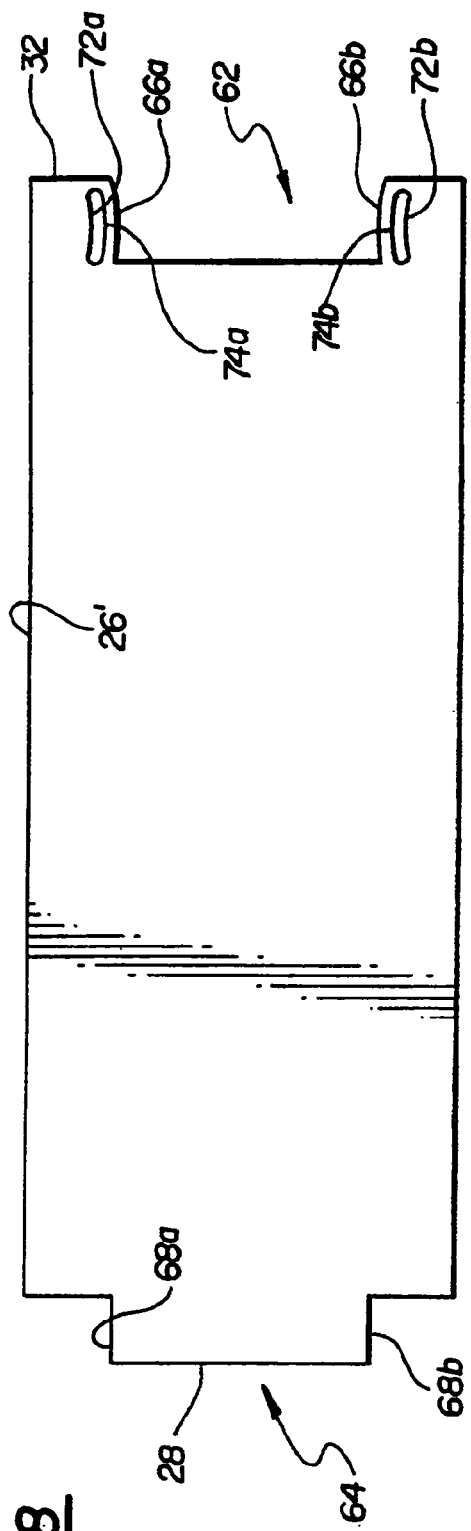
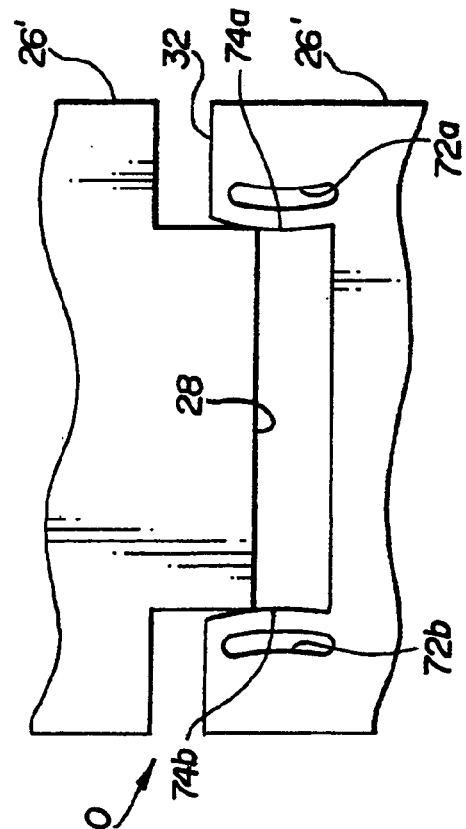
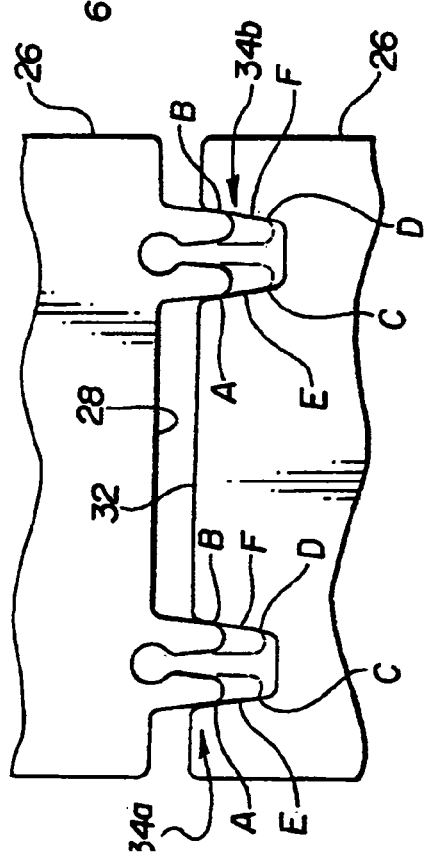

PIPE COUPLER WITH TONGUE AND GROOVE SEALING SLEEVE

CROSS REFERENCE TO RELATED APPLICATION

This application is a continuation of U.S. application Ser. No. 09/886,793 filed Jun. 21, 2001, now U.S. Pat. No. 6,758,501, which claims the benefit of Provisional Patent Application 60/213,791 filed Jun. 23, 2000.

TECHNICAL FIELD

This invention relates to pipe couplings; more particularly, it relates to a type of pipe coupling which is especially adapted for joining two pipe ends in a butt joint. This type of pipe coupling is sometimes referred to in the trade as a pipe coupler.

BACKGROUND OF THE INVENTION

There is a need, especially in the automotive industry, for a pipe coupling for connecting two pipes together in a vehicle engine exhaust system. For example, it is becoming common practice in the repair or servicing of an automobile exhaust system to replace the muffler by cutting the pipe between the muffler and the catalytic converter and attaching a new muffler by use of a special coupling which is herein referred to as a coupler. In this example of use, the coupler must be capable of joining two pipes in a butt joint with a good seal against exhaust gas leakage and which has high pull-apart strength. The use of a butt joint has the advantage of avoiding the need for slotted pipe ends as are commonly used in tail pipe-to-muffler lap joints.

In the prior art, attempts have been made to provide a pipe coupling which would meet the requirements of mechanical strength, exhaust gas sealing properties and long service life required by the automotive industry. However, the prior art leaves much to be desired with respect to the present day requirements.

U.S. Pat. No. 2,227,551 granted Jan. 7, 1941 to Morris describes a pipe coupling which comprises a cylindrical metal sleeve and gasket disposed between a clamping shell and the pipes to be coupled together. The metal sleeve is open with confronting ends which have complementary tongues and recesses which come together when the coupling is tightened.

U.S. Pat. No. 4,056,273 granted Nov. 1, 1977 to Cassel describes a coupling for pipe lap joints which includes a seal ring disposed about the end of the smaller diameter pipe and abutted against the end of the larger diameter pipe. A clamping device has a clamp band which encircles and overlaps the end of the larger diameter pipe and the seal ring. The seal ring includes opposite circumferential ends interengaged with each other, at least one of the seal ring ends having a ramp surface that engages the other seal ring end to move the rings axially relative to each other during clamping of the ring over the inner pipe to thereby provide sealing of the ring between the ring ends.

A general object of this invention is to provide an improved coupler which overcomes certain disadvantages of the prior art.

SUMMARY OF THE INVENTION

In accordance with this invention, a coupler is provided for joining a pair of pipes in a butt joint which provides a good seal against fluid leakage and exhibits high pull-apart strength. This is accomplished by providing an improved sealing sleeve in a band clamp which is capable of applying a high clamping load. Further, the invention is especially adapted for use in a coupler for application in vehicle engine exhaust systems.

Further, in accordance with this invention, an improved coupler is provided which is adapted for high volume production at low cost, is easy to install and exhibits a good gas seal against leakage with high pull-apart strength and has a long service life.

Further, in accordance with this invention, an improved sealing sleeve for a pipe coupler is provided which is constructed of steel with tongue and groove sealing joints which are characterized by an interference fit of side edges with spring members.

A complete understanding of this invention will be obtained from the detailed description that follows taken with the accompanying drawings.

BRIEF DESCRIPTION OF THE DRAWINGS

Referring now to the drawings, two illustrative embodiments of the invention are shown in a pipe coupler especially adapted for use in automotive vehicle engine exhaust systems. It will be appreciated, as the description proceeds, that the invention is useful in many different applications and in a wide variety of embodiments.

FIG. 2 is a cross-sectional view of the coupling of FIG. 1 installed on the abutted ends of two pipes;

FIG. 3 is a side view of the coupling of FIG. 1 installed on the abutted ends of two pipes;

FIG. 7 is a fragmentary view of a split sealing sleeve with tongue and groove sealing joints in sealing engagement;

FIG. 8 is a plan view of a split sealing sleeve used in a second embodiment of the invention; and FIG. 9 is a fragmentary view of a split sealing sleeve of the second embodiment of the invention showing the tongue and groove sealing joint in sealing engagement.

DETAILED DESCRIPTION OF THE PREFERRED EMBODIMENTS

First Embodiment of the Invention

Figure 1:
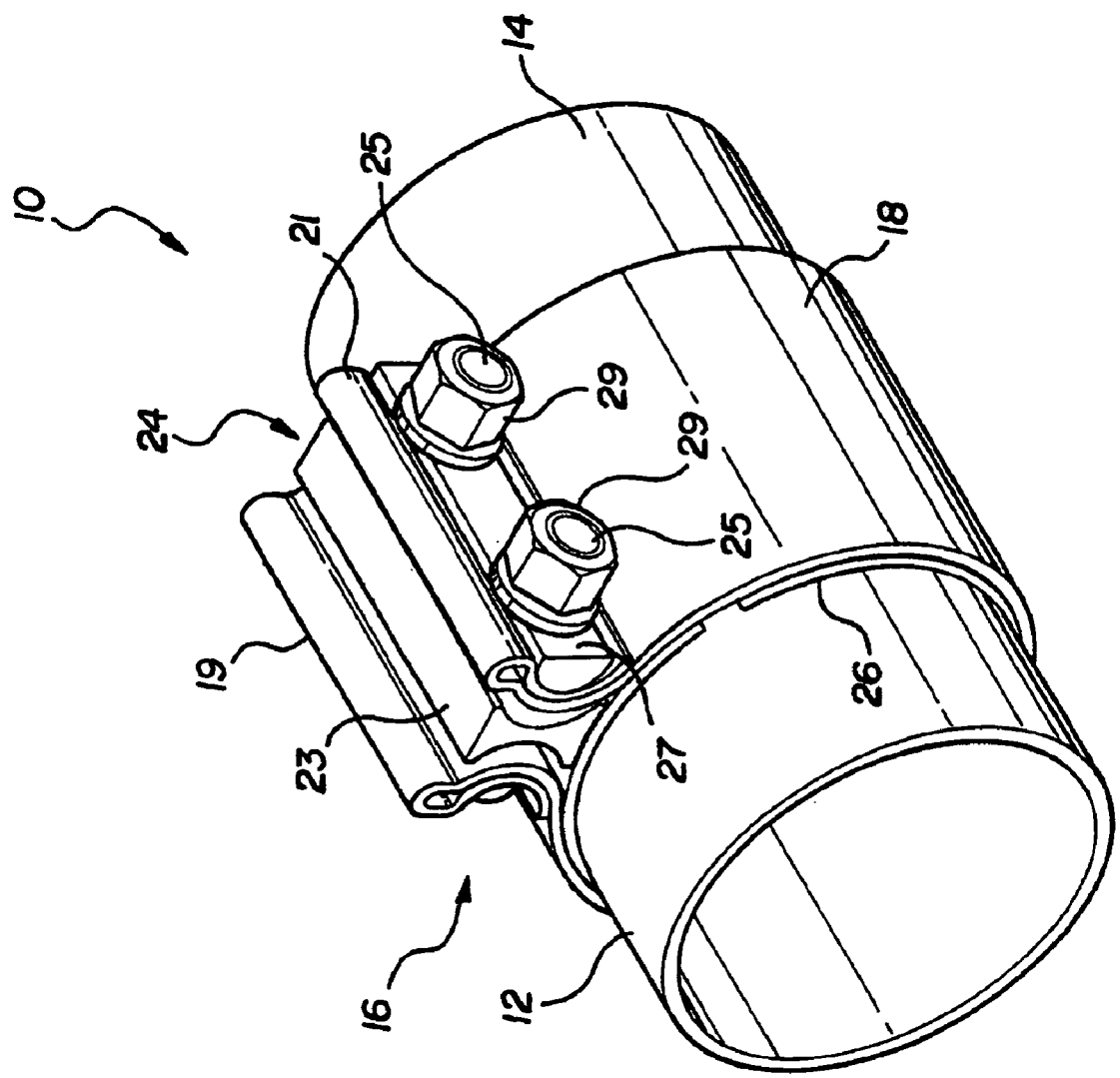
FIG. 1 is a perspective view of a first embodiment of the present invention.

The first embodiment of the invention is shown in FIGS. 1–7. The coupler 10 is adapted to connect a pair of pipes 12 and 14 in a butt joint which provides a good gas seal and a strong mechanical connection between the pipes. The pipes 12 and 14 have the same nominal diameter, subject to manufacturing tolerances. The ends of the pipes 12 and 14 meet at a juncture 22 in axial alignment with each other. The coupler comprises a clamp 16 which includes a clamp band 18 adapted to encircle the pair of pipes and overlap the ends of the pipes. The clamp band 18 is formed as an open sleeve and terminates in laterally extending, opposed flanges 19 and 21. The clamp 16 also includes a tightening mechanism 24 connected with the clamp band for tightening the clamp to reduce the circumferential length of the clamp band. A split sealing sleeve 26 is disposed inside the clamp band 18 and has first and second circumferential ends 28 and 32 with seal structures, respectively, in confronting relationship for contact with each other when the split sealing sleeve is collapsed circumferentially by the clamp band when the clamp is tightened. The sealing sleeve 26 includes a pair of tongue and groove sealing joints 34a and 34b which are provided on the confronting circumferential ends 28 and 32 of the sealing sleeve 26. The opening or gap between the confronting ends 28 and 32 of the sealing sleeve 26 is located circumferentially with respect to the clamp band 18 so that it does not overlap the gap between the flanges 19 and 21. When the clamp 16 is tightened by the tightening mechanism 24, the sealing sleeve 26 is collapsed circumferentially by the clamp band to cause the tongue and groove sealing joints 34 to close and provide a gas seal against leakage to the atmosphere from the juncture 22 of the pipes.

The clamp 16, per se, is of known construction and it is described in U.S. Pat. No. 3,905,623 granted to Cassel granted Sep. 16, 1965 the entire disclosure of which is hereby incorporated by reference into this patent specification. As stated above, the clamp 16 includes a clamp band 18 which is formed as an open sleeve and terminates in laterally extending opposed flanges 19 and 21. The clamp also includes a tightening mechanism 24 connected with the clamp band. The tightening mechanism comprises a spline or reaction member 23 disposed between the flanges 19 and 21 of the clamp band 18. A pair of bolts 25 extend through aligned openings in the flanges and reaction member and a force bar 27 against which threaded nuts 29 are seated for actuating the tightening mechanism. The coupler 10 will be described in greater detail below.

Figure 4:
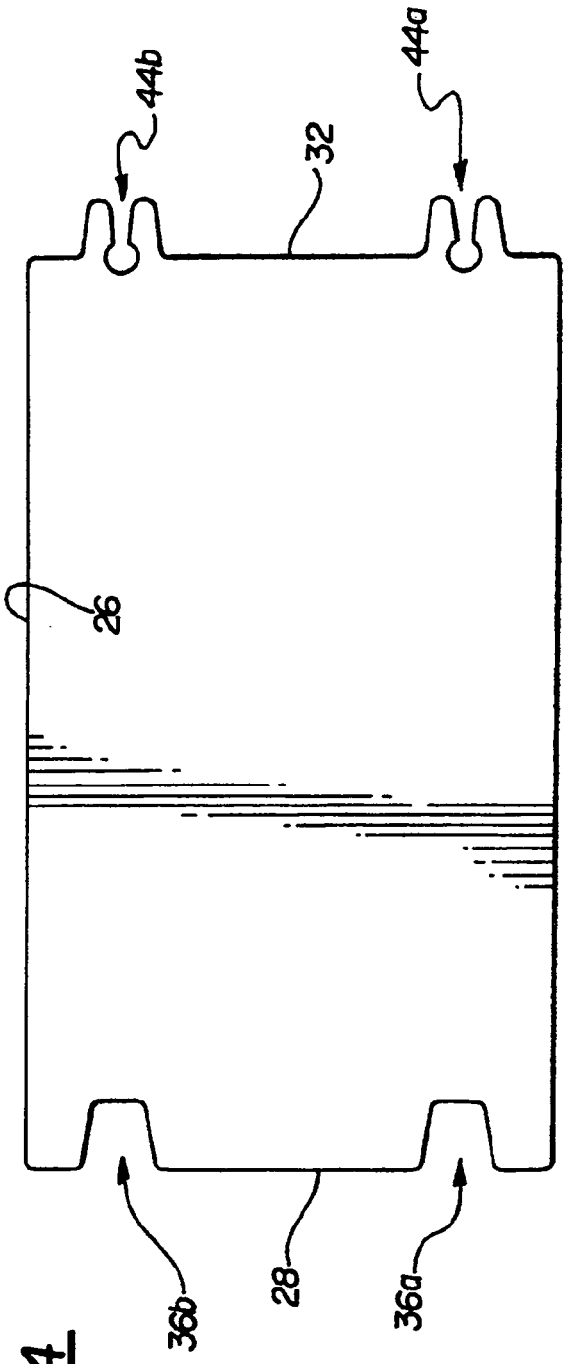
FIG. 4 is a plan view of a split sealing sleeve in its flat condition.
Figure 6:
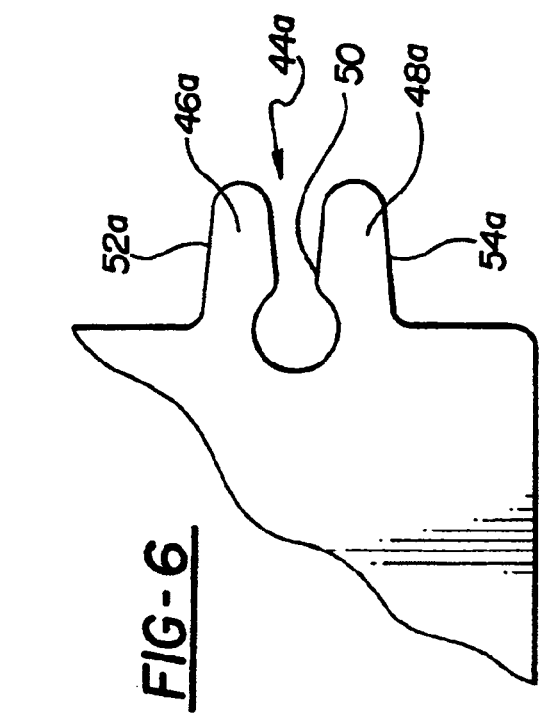
FIG. 6 is an enlarged view of a second portion of FIG. 4.
Figure 5:
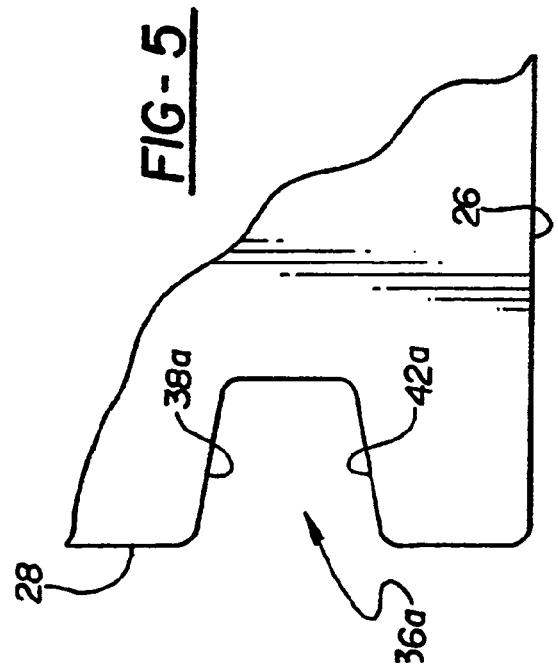
FIG. 5 is an enlarged view of a first portion of FIG. 4.

The split sealing sleeve 26 is made of sheet metal, suitably stainless steel, and is formed by a stamping operation in flat condition as shown in FIG. 4 and is preformed into a circular sleeve for insertion into the clamp band 18. The tongue and groove joints 34a and 34b are disposed in axially spaced relationship on the split sealing sleeve 26 so that the juncture 22 of the pipe ends can be disposed between the pair of tongue and groove joints. The tongue and groove joints 34a and 34b are of the same construction and will be described with reference to joint 34a as shown in FIGS. 4–6. The joint 34a comprises a groove 36a in the end 28 of the sealing sleeve 26. The groove 36a is bounded by side edges 38a and 42a which converge toward each other as the depth of the groove increases from the end 28 of the sealing sleeve. The joint 34a also comprises a tongue 44a which extends from the end 32 of the sleeve in alignment with the groove 36a. The tongue 44a comprises two spring members 46a and 48a separated by a relief slot 50. The tongue 44a is formed with convergent side edges 52a and 54a on the spring members which converge in the same direction as the side edges 38a and 42a of the groove 36a.

The side edges 38a and 42a of the groove 36a are straight except for the corners at the mouth of the groove and at the bottom of the groove each of which is formed with a radius as shown. The side edges of the groove have an angle of convergence, for example, of about 18 degrees, i.e. each side edge extends at an angle of 9 degrees from the center line of the groove. The side edges 52a and 54a of the tongue 44a extend in a straight line between respective corners which are formed with a radius as indicated. When the spring members 46a and 48a are in an unstressed or free condition, the side edges 52a and 54a have a convergence angle, for example, of about 12 degrees, i.e. each side edge makes an angle of 6 degrees with the center line of the tongue 44a. The relief slot 50 is suitably of keyhole shape and is disposed symmetrically with reference to the center line of the tongue.

The spring members 46a and 48a are resilient and constitute cantilever spring arms. The spring members are deflected toward each other in the plane of the tongue when they enter the mating groove and maintain contact with the side edges of the groove 36a to provide a seal against gas leakage.

The pipes 10 and 12, as manufactured, have a specified nominal diameter with a specified allowable tolerance range within which the actual pipe diameter may vary. Consequently, pipes 10 and 12 may have the same nominal diameter but have a different actual diameter. The greatest difference in diameter would occur when one pipe has an actual diameter at the minimum value of the tolerance range and the other pipe has an actual diameter at the maximum value of the tolerance range.

In use, the coupler 10 in its assembled untightened state is positioned over the abutted ends of pipes 12 and 14 with the juncture of the pipe ends located between the tongue and groove sealing joints 34a and 34b. In this position, clamp 16 is ready for tightening by tightening the nuts 29 on the bolts 25. As the tightening of the clamp 16 progresses, the outer ends of the tongues 44a and 44b enter the respective grooves 36a and 36b and the side edges of the tongues engage the side edges of the respective grooves so that there is sliding frictional engagement therebetween. Assuming that both pipe ends have the same actual diameter, both tongues will enter the respective grooves to the same depth of penetration when the tightening of the clamp 16 reaches its final tightening condition. If the actual diameter of both pipes is at the maximum value of the tolerance range, the penetration will be at a minimum depth with a sealing engagement occurring at points A and B on sealing joint 34a and at points A and B on sealing joint 34b as shown in FIG. 7. On the other hand, if the actual diameters of the two pipes are at the minimum value of the tolerance range, then the penetration will be at the maximum depth with a sealing engagement occurring at points C and D as indicated in FIG. 7. If the actual diameters of the pipes are equal and at an intermediate value in the tolerance range, the depth of penetration of the tongues will be at a corresponding intermediate depth and sealing engagement will occur at points E and F in FIG. 7. The spring members 46a and 48a of the tongues 44a and 44b are deflected by engagement with the respective grooves 36a and 36b throughout the indicated range of penetration. This provides an interference fit between the side edges of the tongues and grooves which is effective to maintain a good gas seal. Further, the deflection of the spring members 46a and 48a allows tightening of the clamp to transfer sufficient clamp loading between the sleeve and pipes to prevent relative movement therebetween and to seal against leakage between the outside surface of the pipes and the inside surface of the sleeve.

Assume that the two pipes 12 and 14 have different actual diameters within the allowable pipe diameter tolerance range. In this situation, when final tightening of the clamp 16 is achieved, one side of it will be closed farther than the other side and hence the penetration of the tongue and groove joint on one side of the sealing sleeve 16 will be greater than that on the other side. This will cock the sleeve and, depending upon the cock angle, it may be that only one spring member of each tongue, instead of both, will engage the respective groove to provide sealing engagement. Nevertheless, both sealing joints 34a and 34b are effective to seal against leakage because engagement of only one spring member of each tongue with the groove is needed to block gas leakage. Further, because of the resilience of both spring members, the tongue can be compressed during tightening to prevent excessive interference that would inhibit adequate clamp closure. Thus, when the tightening of the clamp 16 reaches the final tightening condition the clamp band 18 is stretched around the sealing sleeve 26 and maintains a clamping force which holds the tongue and groove joints in sealed condition and holds the sealing sleeve sealed against the outer surfaces of the pipes 12 and 14 and the inner surface of the clamp band so that fluid leakage between the ends of the pipes is blocked from escaping to the atmosphere.

Second Embodiment of the Invention

A second embodiment of the invention will now be described. The coupler of the second embodiment is of the same construction as the coupler of FIGS. 1–7 except for a different construction of the split sealing sleeve 26' which is shown in FIGS. 8 and 9. The sealing sleeve 26' is of the same type as the first embodiment but has only one tongue and groove joint 60. The Joint 60 comprises a groove 62 defined by one end of the sleeve 26' and a tongue 64 defined by the other end of the sleeve. The groove 62 has oppositely disposed side edges 66a and 66b. The tongue 64 has oppositely disposed side edges 68a and 68b. The side edges of the groove 62 have an arcuate configuration which extends inwardly of the groove such that the groove is wider at its open end and at its closed end than it is in the region therebetween. A relief slot 72a is disposed adjacent the side edge 66a and extends in the same direction and thereby forms a spring edge member 74a. Similarly, a relief slot 72b is disposed adjacent the side edge 66b and extends in the same direction and thereby forms a spring edge member 74b.

The tongue 64 is rectangular with straight side edges and has a width somewhat narrower than the width of the entrance mouth of the groove 62 and somewhat greater than the narrowest width between the spring edges members 74a and 74b.

In the use of the coupler implemented with the split sealing sleeve 26', the single tongue and groove joint 60 is closed concurrently with the tightening of the clamp of the coupler in the same manner as described with reference to the coupler of FIGS. 1–7. As the tightening of the clamp progresses, the outer end of the tongue 64 enters the groove 62 and the side edges of the tongue engage the respective side edges of the groove so that there is a sliding frictional engagement therebetween. The spring edge members 74a and 74b of the side edges of the groove 62 accommodate the variation of actual dimensions of the pipes 12 and 14 within the manufacturing tolerance range in much the same manner as described with reference to the coupler of FIGS. 1–7. If the two pipes have actual diameters of equal value, the tongue 64 will penetrate an amount corresponding to the actual diameter and develop sealing engagement with the side edges of the groove. If two pipes have different actual diameters, the sleeve will cock accordingly and the side edges of the tongue will maintain contact with the side edges of the groove to provide a seal against leakage through the tongue and groove joint 62. Also, the spring edge members 74a and 74b will provide engagement without excessive interference that would prevent closing the clamp with tight sealing engagement and transfer of sufficient clamp loading to prevent relative movement between the pipes.

Although the description of this invention has been give with reference to particular embodiments, it is not to be construed in a limiting sense. Many variations and modifications of the invention will now occur to those skilled in the art.

As used in this specification and appended claims, the term "for example" and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A pipe coupler for connecting two axially-aligned, adjoining ends of a pair of pipes, comprising:
   a clamp band extending circumferentially from a first end to a second end and extending axially for a length sufficient to extend over each of two axially-aligned, adjoining ends of a pair of pipes;
   a tightening mechanism located at said first and second ends of said clamp band, said tightening mechanism including at least one fastener to tighten said clamp band by drawing said first and second ends towards each other; and
   a split sealing sleeve located radially inside said clamp band in contact with said clamp band, said split sealing sleeve having first and second circumferential ends in confronting relationship for contact with each other when said sealing sleeve is collapsed circumferentially by tightening of said clamp band, said sealing sleeve including at least one tongue and groove sealing joint, said groove being defined at one circumferential end of the sealing sleeve and said tongue being defined at the other circumferential end of the sealing sleeve, said tongue being disposed opposite said groove for mating with said groove when said sealing sleeve is collapsed circumferentially, the tongue and the groove each having first and second side edges, the first side edge of the tongue and the first side edge of the groove being a first mating-pair of side edges, the second side edge of the tongue and the second side edge of the groove being a second mating-pair of side edges, said tongue having a non-locking interference fit with said groove throughout a range of penetration extending from initial engagement to a point of maximum penetration for both of said mating-pairs, wherein a central portion of at least one of said first side edges is non-parallel relative to a circumferential centerline of said sleeve, said sealing sleeve including a relief slot adjacent one of said first side edges forming a spring member which yields in response to penetration of said tongue into said groove, the width of said tongue before insertion into said groove being greater than the width of said groove, wherein forceful penetration of said tongue into said groove during tightening of said clamp band causes engagement of said non-parallel first side edges with each other and said second side edges with each other which, during further tightening of said clamp, causes said sealing sleeve to deform at said relief slot as said tongue penetrates into said groove.

2. A coupler as defined in claim 1, wherein there are two tongue and groove sealing joints which are axially spaced apart whereby the coupler may be positioned with respect to said pair of pipes so that the two joints are disposed on opposite sides of the adjoining ends of said pipes.

3. A coupler as defined in claim 2, wherein said spring member is one of two spring members that together comprise the tongue in the first joint, and wherein the tongue in the second joint also comprises two spring members.

4. A coupler as defined in claim 1, wherein said spring member is a cantilever spring arm.

5. A coupler as defined in claim 1, wherein said spring member is a unitary strip of arcuate shape extending along said relief slot.

6. A coupler as defined in claim 1, wherein said first side edge of said tongue is disposed at an angle of about six degrees relative to a centerline of said tongue, and said first side edge of said groove is disposed at an angle of about nine degrees relative to a centerline of said groove.

7. A coupler as defined in claim 1, wherein said sealing sleeve includes a pair of said tongue and groove sealing joints.

8. A coupler as defined in claim 1, wherein first side edge of said tongue is substantially parallel to a centerline of said tongue, and said first side edge of said groove is curved outwardly into said groove.

9. In a coupler for connecting a pair of pipes, said coupler being of the type comprising a clamp which includes a clamp band adapted to encircle a pair of pipes at a juncture of adjoining ends that are disposed in axial alignment with each other, said clamp band being wide enough to overlap the respective ends of the pair of pipes, said clamp also including a tightening mechanism connected with said clamp band for tightening said clamp band, and a split sealing sleeve inside said clamp band and having first and second circumferential ends in confronting relationship for contact with each other when the sealing sleeve is collapsed circumferentially by said clamp band, the improvement wherein:
   said sealing sleeve includes a tongue-and-groove sealing joint located on said circumferential ends,
   said sealing joint comprising a groove defined at one circumferential end of the sealing sleeve and a tongue defined at the other circumferential end of the sealing sleeve, said tongue being disposed opposite said groove for mating with said groove when said sealing sleeve is collapsed circumferentially, one of said tongue and groove having first and second substantially straight and parallel side edges and the other of said tongue and groove having first and second convex arcuate side edges, the first side edge of the tongue and the first side edge of the groove being a first mating-pair of side edges, the second side edge of the tongue and the second side edge of the groove being a second mating-pair of side edges, said tongue having an interference fit with said groove, throughout a range of penetration of said tongue into said groove,
   at least one side edge of at least one of the mating-pairs of side edges being a spring member whereby a seal is provided by the engagement of the mating-pair of side edges when the clamp is tightened.

10. A coupler as defined in claim 9, wherein each of said arcuate side edges is a spring member.

11. A coupler as defined in claim 9, wherein said spring member is a unitary strip of arcuate shape extending along a relief slot located adjacent one of said arcuate side edges.

12. A coupler as defined in claim 11, wherein said relief slot is disposed adjacent a side edge of said groove.

13. A coupler as defined in claim 9, wherein said spring member is defined at least in part by a relief slot located adjacent one of said side edges.

14. A pipe coupler for connecting two axially-aligned, adjoining ends of a pair of pipes, comprising:
   a clamp band extending circumferentially from a first end to a second end and extending axially for a length sufficient to extend over each of two axially-aligned, adjoining ends of a pair of pipes;
   a tightening mechanism located at said first and second ends of said clamp band, said tightening mechanism including at least one fastener to tighten said clamp band by drawing said first and second ends towards each other; and
   a split sealing sleeve located radially inside said clamp band in contact with said clamp band, said split sealing sleeve having first and second circumferential ends in confronting relationship for contact with each other when said sealing sleeve is collapsed circumferentially by tightening of said clamp band, said sealing sleeve including at least one tongue and groove sealing joint, said groove being defined at one circumferential end of the sealing sleeve and said tongue being defined at the other circumferential end of the sealing sleeve, said tongue being disposed opposite said groove for mating with said groove when said sealing sleeve is collapsed circumferentially, the tongue and the groove each having first and second side edges, the first side edge of the tongue and the first side edge of the groove being a first mating-pair of side edges, the second side edge of the tongue and the second side edge of the groove being a second mating-pair of side edges, said tongue having a non-locking interference fit with said groove throughout a range of penetration extending from initial engagement to a point of maximum penetration for both of said mating-pairs, said sealing sleeve including a relief slot adjacent one of said side edges forming a spring member which yields in response to penetration of said tongue into said groove, the width of said tongue before insertion into said groove being greater than the width of said groove, wherein forceful penetration of said tongue into said groove during tightening of said clamp band causes said sealing sleeve to deform at said relief slot as said tongue penetrates into said groove;
   wherein said relief slot is disposed adjacent a side edge of said groove, and said spring member is a unitary strip of arcuate shape extending along said relief slot adjacent said side edge of said groove.

* * * * *